United States Patent
Kim et al.

(10) Patent No.: US 11,529,611 B2
(45) Date of Patent: Dec. 20, 2022

(54) COMPOSITION FOR FORMING ABSORPTION-DESORPTION SHEET, ABSORPTION-DESORPTION SHEET INCLUDING THE COMPOSITION, AND METHOD OF PREPARING THE ABSORPTION-DESORPTION SHEET

(71) Applicant: KOREA INSTITUTE OF SCIENCE AND TECHNOLOGY, Seoul (KR)

(72) Inventors: Jungsun Kim, Seoul (KR); Dae-Young Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 352 days.

(21) Appl. No.: 15/854,679

(22) Filed: Dec. 26, 2017

(65) Prior Publication Data

US 2018/0178195 A1  Jun. 28, 2018

(30) Foreign Application Priority Data

Dec. 27, 2016 (KR) .................. 10-2016-0180131

(51) Int. Cl.
*C08F 2/32* (2006.01)
*B01J 20/32* (2006.01)
*B01J 20/26* (2006.01)
*B01J 20/28* (2006.01)
*B01D 53/28* (2006.01)
*B01D 53/26* (2006.01)
*B01D 53/04* (2006.01)

(52) U.S. Cl.
CPC ........ *B01J 20/327* (2013.01); *B01D 53/0407* (2013.01); *B01D 53/261* (2013.01); *B01D 53/28* (2013.01); *B01J 20/267* (2013.01); *B01J 20/28035* (2013.01); *B01D 2253/202* (2013.01); *B01D 2253/25* (2013.01)

(58) Field of Classification Search
CPC .......... C08F 2/32; B01J 20/327; B01J 20/267; B01J 20/28035
USPC ....................................... 524/417
See application file for complete search history.

(56) References Cited

FOREIGN PATENT DOCUMENTS

| GB | 1290766 A | * | 9/1972 | ............. G03F 7/031 |
|----|-----------|---|--------|-------------------------|
| GB | 2093464 A | * | 9/1982 | ................ C08F 2/32 |
| JP | 63031522 A | * | 2/1988 | |
| JP | 05103944 A | * | 4/1993 | |
| JP | 05105704 A | * | 4/1993 | ............ C08F 220/04 |
| JP | 05105705 A | * | 4/1993 | |
| JP | 05105705 A | | 4/1993 | |
| JP | 2015123378 A | | 7/2015 | |

* cited by examiner

*Primary Examiner* — Kelechi C Egwim
(74) *Attorney, Agent, or Firm* — Cantor Colburn LLP (57) ABSTRACT

Provided are a composition for forming an absorption-desorption sheet, an absorption-desorption sheet including the same, and a method of preparing the absorption-desorption sheet. The composition for forming an absorption-desorption sheet includes: a polymerizable first monomer or oligmer comprising an ionic hydrophilic group; a polymerizable second monomer or oligmer comprising a non-ionic hydrophilic group; and a deliquescent salt that has excellent absorption-desorption performance- and allows repeated use of the absorption-desorption sheet. In addition, the absorption-desorption sheet has antibacterial and deodorant performance, and thus, is able to inhibit the growth of bacteria and fungi in a humid environment.

16 Claims, 5 Drawing Sheets

COMPOSITION FOR FORMING ABSORPTION-DESORPTION SHEET, ABSORPTION-DESORPTION SHEET INCLUDING THE COMPOSITION, AND METHOD OF PREPARING THE ABSORPTION-DESORPTION SHEET

CROSS-REFERENCE TO RELATED APPLICATION

This application claims the benefit of Korean Patent Application No. 10-2016-0180131, filed on Dec. 27, 2016, in the Korean Intellectual Property Office, the disclosure of which is incorporated herein in its entirety by reference.

BACKGROUND

1. Field

One or more embodiments relate to a composition for forming an absorption-desorption sheet, an absorption-desorption sheet including the composition, and a method of preparing the absorption-desorption sheet, and more particularly, to a composition for forming an absorption-desorption sheet, the composition having good absorption-desorption performance and being capable of repeated use, an absorption-desorption sheet including the composition, and a method of preparing the absorption-desorption sheet.

2. Description of the Related Art

Inorganic dehumidifying agents, such as silica gel or zeolite, which have been generally used as air moisture removal materials, are disadvantageous in that they have insufficient absorption capacity and are not easy to reuse as high heat is required for reuse.

In addition, dehumidifying agents, such as lithium chloride, calcium chloride, magnesium chloride, and sodium chloride, which have been conventionally used for removing moisture from air, have good absorption capacity. However, due to deliquescence, such dehumidifying agents may be liquefied after absorbing moisture and it is difficult to repeatedly use them since salt solutions may be lost or may not be fixed to a specific base.

SUMMARY

One or more embodiments include a composition for forming an absorption-desorption sheet, the composition having good absorption-desorption performance and being capable of repeated use.

One or more embodiments include an absorption-desorption sheet prepared by using the composition.

One or more embodiments include a method of preparing the absorption-desorption sheet.

Additional aspects will be set forth in part in the description which follows and, in part, will be apparent from the description, or may be learned by practice of the presented embodiments.

According to one or more embodiments, a composition for forming an absorption-desorption sheet includes:
a polymerizable first monomer or oligomer having an ionic hydrophilic group;
a polymerizable second monomer or oligomer having a non-ionic hydrophilic group; and
a deliquescent salt.

The first monomer or oligomer may include at least one selected from the group consisting of an acrylate-based monomer or oligomer, a vinyl-based monomer or oligomer, or a combination thereof.

The acrylate-based monomer or oligomer may be in a form in which a metallic salt is bonded to an acrylate.

The acrylate-based monomer or oligomer may include a metallic carbonyl group having at least one selected from a calcium, sodium, lithium, magnesium, potassium, zirconium, and zinc metal.

The vinyl-based monomer or oligomer may include have a vinyl group, and at the same time, may include at least one selected from a sulfonic acid group, a phosphoric acid group, and an ammonium group having a vinyl group.

The second monomer or oligomer may include at least one selected from the group consisting of an amide-based monomer or oligomer, an oxide-based monomer or oligomer, or a combination thereof.

The amide-based monomer or oligomer may include at least one selected from the group consisting of acrylamide, methacrylamide, N-methylacrylamide, N-methyl(meth)acrylamide, N-ethylacrylamide, N-ethyl(meth)acrylamide, N-propylacrylamide, and N-propyl(meth)acrylamide.

The oxide-based monomer or oligomer may include at least one selected from the group consisting of ethylene oxide, propylene oxide, isobutylene oxide, 1-butene oxide, 2-butene oxide, trimethylethylene oxide, tetramethylene oxide, tetramethylethyl oxide, butadiene monoxide, octylene oxide, styrene oxide, 1,1-diphenylethylene oxide, starch, and cellulose.

The deliquescent salt may include at least one selected from the group consisting of lithium chloride (LiCl), sodium chloride (NaCl), potassium chloride (KCl), magnesium chloride ($MgCl_2$), calcium chloride ($CaCl_2$)), zinc chloride ($ZnCl_2$), sodium hydroxide (NaOH), potassium hydroxide (KOH), potassium carbonate ($K_2CO_3$), potassium phosphate ($KH_2PO_4$), carnallite ($KMgCl_3.6(H_2O)$), and lithium bromide (LiBr).

An amount of the second monomer or oligomer may be in a range of about 30 parts to about 500 parts by weight based on 100 parts by weight of the first monomer or oligomer, and an amount of the deliquescent salt may be in a range of about 40 parts to about 80 parts by weight based on 100 parts by weight of the total amounts of the first monomer or oligomer and the second monomer or oligomer.

The composition for forming an absorption/desorption sheet may further include a solvent.

The solvent may include at least one selected from the group consisting of water, alcohols, benzenes, acetones, esters, aldehydes, and ethers.

The composition for forming an absorption/desorption sheet may further include at least one selected from the group consisting of an initiator, a cross-linking agent, a catalyst, a viscosity controlling modifier, a dispersant, a filler, an adhesive, and a surfactant.

According to one or more embodiments, an absorption-desorption sheet includes a polymer of the composition for forming an absorption-desorption sheet.

According to one or more embodiments, a method of preparing the absorption/desorption sheet includes:
preparing a coating solution including the composition for forming an absorption/desorption sheet;
coating a base with the coating solution; and
heating the coated base to polymerize the coating solution.

In an embodiment, the heating may be performed at a temperature in a range of about 30° C. to about 200° C.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

According to an embodiment, there is provided a composition for forming an absorption-desorption sheet, the composition including:

a polymerizable first monomer or oligomer having an ionic hydrophilic group;

a polymerizable second monomer or oligomer having a non-ionic hydrophilic group; and a deliquescent salt.

In the case of a conventional dehumidifying agent prepared by mixing a hygroscopic salt with a polymer component in a granular form, due to a property of an absorbent polymer powder that swells after absorption, repeated absorption and drying may cause degradation of durability due to surface desorption of the polymer powder from the base. However, the composition for forming an absorption-desorption sheet according to an embodiment does not include an absorbent polymer powder, but is rather prepared by using the first monomer or oligomer and the second monomer or oligomer which are in a state before polymerization. In this regard, the first monomer or oligomer and the second monomer or oligomer may be polymerized with the deliquescent salt together, thereby forming a polymer sheet. The deliquescent salt may be embedded in the polymer sheet. Therefore, the polymer sheet itself does not cause desorption of the polymer powder as in the related art even if the polymer sheet is repeatedly absorbed and dried, so that the durability of the absorption-desorption sheet may be improved.

The polymer, which is formed by polymerization of the polymerizable first monomer or oligomer including an ionic hydrophilic group and the polymerizable second monomer or oligomer including a non-ionic hydrophilic group, may have high absorbency. In addition, since the deliquescent salt may absorb a salt solution generated after absorption of moisture, loss of the deliquescent salt may be prevented. Furthermore, the composition for forming an absorption-desorption sheet may have larger absorption capacity than that of the conventional inorganic-based dehumidifying agent, and may easily undergo comparative molding, so that an absorption-desorption sheet may be prepared in various shapes.

The polymerizable first monomer or oligomer including the ionic hydrophilic group is an ionic substance that meets with water after polymerization, and accordingly has a period of action and an electrostatic repulsion between chains, thereby causing swelling.

The polymerizable first monomer or oligomer including the ionic hydrophilic group is a monomer or oligomer capable for forming a polymer electrolyte after polymerization, and for example, may include at least one selected from the group consisting of an acrylate-based monomer or oligomer, a vinyl-based monomer or oligomer, and a combination thereof.

The acrylate-based monomer or oligomer may be, for example, in a form in which a metallic salt is bonded to an acrylate. The acrylate-based monomer or oligomer may have a metallic carbonyl group having at least one selected from a calcium, sodium, lithium, magnesium, potassium, zirconium, and zinc metal. The acrylate-based monomer or oligomer may include, for example, at least one selected from the group consisting of $CH_2CHCOONa$, $CH_2CHCOOK$, $(CH_2CHCOO)_2Zn_2$, $CH_2CHCOOLi$, and $(CH_2CHCOO)_4Zr_4$.

The vinyl-based monomer or oligomer may have a vinyl group, and at the same time, may include at least one selected from a sulfonic acid group, a phosphoric acid group, and an ammonium group having a vinyl group. The vinyl-based monomer or oligomer may be, for example, sodium allylsulfonate, vinylsulfonic acid, vinylphosphonic acid, ethylene glycol methacrylate phosphate, and vinyl ammonium iodide, but examples of the vinyl-based monomer or oligomer are not limited thereto.

The first monomer or oligomer may be used alone, or may be used in combination of two or more monomers or oligomers.

The polymerizable second monomer or oligomer having the non-ionic hydrophilic group is a substance forming a hydrogen bond with water, and is not an ionic substance so that no ion is cancelled in the presence of the deliquescent salt. Therefore, regardless of the deliquescent salt, the polymerizable second monomer or oligomer may exhibit a constant absorption function.

The polymerizable second monomer or oligomer having the non-ionic hydrophilic group may include, for example, at least one selected from the group consisting of an amide-based monomer or oligomer, an oxide-based monomer or oligomer, and a combination thereof.

The amide-based monomer or oligomer may include, for example, at least one selected from the group consisting of acrylamide, methacrylamide, N-metylacrylamide, N-methyl (meth)acrylamide, N-ethylacrylamide, N-ethyl(meth)acrylamide, N-propylacrylamide, and N-propyl(meth)acrylamide.

The oxide-based monomer or oligomer may include, for example, at least one selected from the group consisting of ethylene oxide, propylene oxide, isobutylene oxide, 1-butene oxide, 2-butene oxide, trimethylethylene oxide, tetramethylene oxide, tetramethylethyl oxide, butadiene monoxide, octylene oxide, styrene oxide, 1,1-diphenylethylene oxide, starch, and cellulose.

The second monomer or oligomer may be used alone or may be used in combination of two or more monomers or oligomers.

In the composition for forming an absorption-desorption sheet according to an embodiment, an amount of the second polymer may be in a range of about 30 parts to about 500 parts, for example, about 100 parts to about 400 parts, or about 200 parts to about 300 parts, based on 100 parts by weight of the first monomer or oligomer, Within the amount range above, cancellation of ions may be minimized while high absorption performance may be exhibited in a wide range of humidity. The first monomer or oligomer may cause a side effect, such as ionic bonding or ionic cancellation with the deliquescent salt to be added, so that the amount of the first monomer or oligomer may be less than or equal to that of the second monomer or oligomer.

The deliquescent salt used in the composition for forming an absorption/desorption sheet may be liquefied by sucking moisture in the air as well as water in the atmosphere. Since the deliquescent salt may be embedded in the polymer sheet that is formed by polymerization of the first monomer or oligomer and the second monomer or oligomer, a salt solution produced by liquefaction of the deliquescent salt may have a dehumidifying mechanism by absorption by the polymer sheet.

The deliquescent salt may include, for example, at least one selected from the group consisting of lithium chloride (LiCl), sodium chloride (NaCl), potassium chloride (KCl), magnesium chloride ($MgCl_2$), calcium chloride ($CaCl_2$)), zinc chloride ($ZnCl_2$), sodium hydroxide (NaOH), potassium hydroxide (KOH), potassium carbonate ($K_2CO_3$), potassium phosphate ($KH_2PO_4$), carnallite ($KMgCl_3 \cdot 6(H_2O)$), and lithium bromide (LiBr).

In the composition for forming an absorption-desorption sheet according to an embodiment, an amount of the deliquescent salt may be in a range of about 40 parts to about 80 parts by weight based on 100 parts by weight of the total amounts of the first monomer or oligomer and the second monomer or oligomer. When the deliquescent salt is added in an amount greater than the range above, an amount of a salt solution formed after absorption of moisture is excessively large, so that the salt solution may flow before being absorbed into the polymer, thereby losing the salt solution. When the deliquescent salt is added in an amount less than the range above, desired absorption capacity may not be exhibited.

The composition for forming an absorption-desorption sheet according to an embodiment may further include a solvent. Types of the solvent are not limited, and may be selected in consideration of a base to be coated with the composition or compatibility with an additive. The solvent may include, for example, at least one selected from the group consisting of water, alcohols, benzenes, acetones, esters, aldehydes, and ethers. Types of water may typically include pure water, distilled water, ground water, and filtered water, and for example, water may be prepared by purifying typical raw water to have high purity. Glycerin, trimethylol propane, or polyethylene glycol, which are water-soluble organic solvents in water and an organic solvent, may be used in terms of eco-friendly aspects.

The composition for forming an absorption-desorption sheet according to an embodiment may further include, if necessary, at least one selected from the group consisting of an initiator, a cross-linking agent, a catalyst, a viscosity controlling modifier, a dispersant, a filler, an adhesive, and a surfactant.

The initiator may assist a polymerization reaction between the first monomer or oligomer and the second monomer or oligomer, and examples thereof include a peroxide initiator, an ammonium disulfate initiator, and the like.

The cross-linking agent may assist the preparation of a further strong absorption/desorption sheet. Examples of the cross-linking agent include N,N'-methylenebisacrylamide, ethylene glycol dimethacrylate, aryl methacrylate, arylmethacrylate, tetra-aryloxy ethane, trimethylolpropane triacrylate, and triarylamine.

To control a reaction speed of the composition for forming an absorption-desorption sheet, a catalyst may be added. According to an embodiment, the catalyst may include tetraethylene methylenediamine.

In addition, a viscosity modifier may be added to improve a coating property, and examples of the viscosity modifier include polyester, epoxy, and latex.

A plasticizer may be used to improve the flexibility of the polymer itself after formation of the absorption-desorption sheet.

The composition for forming an absorption-desorption sheet facilitates molding, and accordingly, an absorption-desorption sheet may be prepared in various shapes.

For example, the composition for forming an absorption-desorption sheet may be coated in a sheet form, and then, polymerized, thereby preparing an absorption-desorption sheet in a sheet form.

The absorption-desorption sheet prepared by using the composition may exhibit moisture absorption that is about 5 times or more greater than the existing absorbent formed of a porous ceramic material. When tested according to the humidity response method using an absorption/desorption testing method on building materials (see ISO 24353:2008, JIS A 1470 the absorption performance of the absorption/desorption sheet, −1:2008, JIS A 1470-2:2008, KS F 2611) regarding the absorption performance of the absorption-desorption sheet, it was confirmed through Examples below that the absorption-desorption sheet had performance results far better than the absorption/desorption amount of 65 $g/m^2$, which is the standard for absorption-desorption materials in health-friendly housing construction.

When the absorption-desorption sheet is used as a wall paper, moisture may be absorbed in wet weather, and moisture may be desorbed in dry weather, thereby controlling humidity of the air of a room without using separate energy. In addition, when absorption-desorption sheet is prepared by using the composition, various demands, such as prevention of fungi in the underground space based on antimicrobial and antifungal performance of the absorption/desorption sheet, humidity control of wet spaces including balcony veranda, and prevention of fungi.

According to an embodiment, there is provided a method of preparing an absorption-desorption sheet, the method including:

preparing a coating solution including the composition for forming an absorption-desorption sheet;

coating a base with the coating solution; and heating the coated base, thereby polymerizing the coating solution.

First, a coating solution including the composition for forming an absorption-desorption sheet is prepared.

A base to be coated with the coating solution is not particularly limited, and examples thereof include nonwoven fabrics, papers, fibers, plastics, and metals. The form of the base may vary. The base having various materials and shapes may be coated with the coating solution including the composition for forming an absorption-desorption sheet, may be subjected to polymerization, and then, may be molded into various shapes.

After the base is coated with the prepared coating solution, heating is performed thereon for polymerization of the coating solution.

The way of performing the coating is not particularly limited, and examples thereof include screen printing, pink jet, dip coating, and spray coating.

As the coating solution is dried by heating, the first monomer or oligomer and the second monomer or oligomer in the coating solution may be polymerized. The heating for drying and polymerization may be performed at a temperature of at least about 30° C. In an embodiment, the heating may be performed at a temperature in a range of about 30° C. to about 200° C. In an embodiment, the heating may be performed at a temperature in a range of about 40° C. to about 100° C.

To volatilize the remaining solvent after the polymerization, the temperature at which the heating is performed may be further raised to dry the coating solution.

Hereinafter, the present inventive concept will be described in detail with respect to Examples and Comparative Examples below, and should not be construed as being limited to these Examples and Comparative Examples so that this disclosure will be thorough and complete, and will fully convey the concept of the present inventive concept to those skilled in the art.

Example 1: Preparation of an Absorption-Desorption Sheet 5 g of sodium acrylate, which is a first monomer or oligomer, and 3.7 g of methacrylamide, which is a second monomer or oligomer, were added to 70 ml of water, which is a solvent, and then, sufficiently mixed. 5 g of lithium chloride, which is a deliquescent salt, were added thereto to be dissolved in water. Then, a buffer solution was used to adjust the pH of the mixed solution to 7. Afterwards, 0.026 g of triarylamine, which is a cross-linking agent, were added thereto. Once the cross-linking agent was completely dissolved, 0.07 g of an initiator were added thereto, and then, the mixed solution was stirred. After 15 minutes, 0.05 ml of a catalyst were added thereto, and a nonwoven fabric (having a size of 30 cm*30 cm) was heated with the mixed solution, followed by being heated at a temperature of 70° C. for polymerization. In consideration of coating properties, a small amount of a thickener may be added. The coating solution was heated at a temperature of 70° C. for about 1 hour to evaporate the solvent by volatilization while the polymerization was performed, thereby preparing an absorption/desorption sheet.

Figure 1:
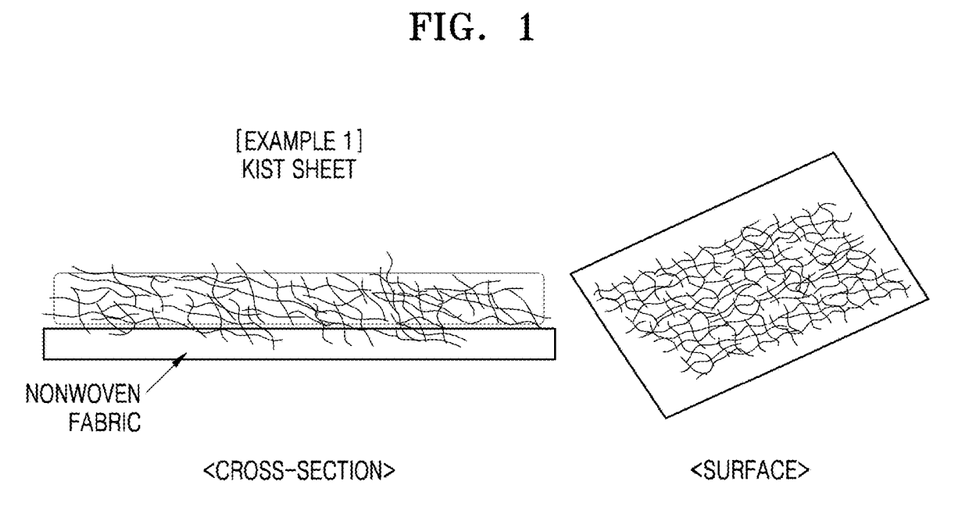
FIG. 1 is a schematic view showing a cross-section and a surface of an absorption-desorption sheet prepared according to Example 1.

FIG. 1 is a schematic view showing a cross-section and a surface of the absorption-desorption sheet (hereinafter, referred to as 'KIST SHEET') prepared according to Example 1.

Example 2: Preparation of an Absorption-Desorption Sheet

An absorption-desorption sheet was prepared in the same manner as in Example 1, except that sodium chloride was used instead of lithium chloride.

Comparative Example 1: Preparation of a Polymer Powder Coated Sheet

As described in Example 1, equivalents amounts of a first monomer or oligomer and a second monomer or oligomer were added to a solvent, but lithium chloride was not used herein. Other components including a buffer solution, a cross-linking agent, an initiator, and a catalyst were all used in the same manner as in Example 1. A temperature of a reaction tube was raised up to 65° C. to perform polymerization. Once the polymerization was completed, dehumidifying agent bulk was cut and lyophilized. In consideration of complete drying, drying was additionally performed in an oven. After drying was completed, a pulverizer was used with a sieve for pulverization, thereby obtaining dehumidifying agent powder having a diameter of 53 μm or less.

Then, the dehumidifying agent powder was used to prepare a coating solution to perform coating. In detail, 5 g of lithium chloride were added to 16 g of methanol, which is a solvent. When the mixed solution was sufficiently stirred, the prepared dehumidifying agent powder was added to thereto to be dispersed therein. Afterwards, 3 g of a hydrophilic additive (based on solid content) were added thereto and mixed. A nonwoven fabric was coated with the prepared coating solution, and a heating process was performed thereon at a temperature of 70° C., thereby preparing powder-coated sheet.

Figure 2:
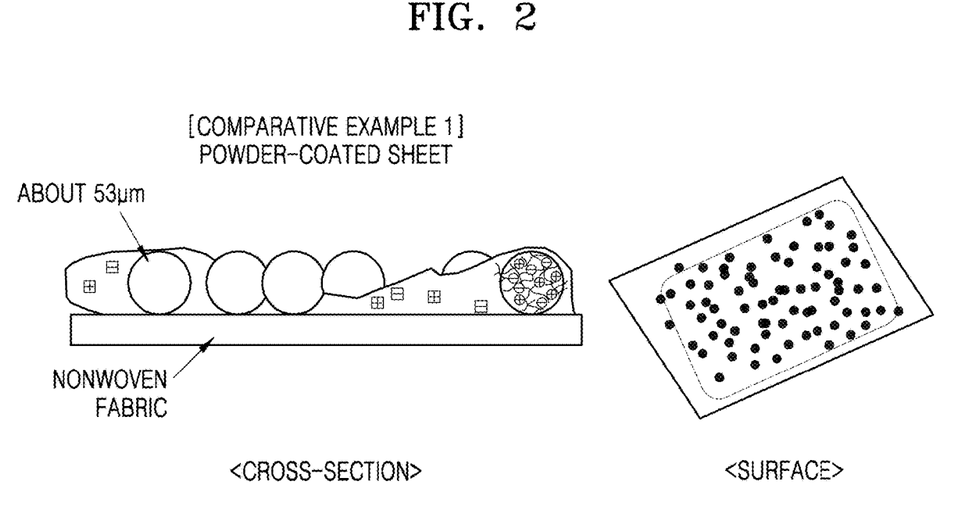
FIG. 2 is a schematic view showing a cross-section and a surface of a powder-coated sheet prepared according to Comparative Example 1.

FIG. 2 is a schematic view showing a cross-section and a surface of a powder-coated sheet prepared according to Comparative Example 1.

Comparative Example 2: Winia Dehumidifying Agent

A commercially available Winia dehumidifying agent (WDH-K11R), which may be used repeatedly, was purchased and used as it was in a nonwoven bag. This material is specified as type B silica gel.

Evaluation Example 1: Evaluation on Durability

The absorption-desorption sheet prepared according to Example 1 and the powder-coated sheet prepared according to Comparative Example 1 were immersed in water, and after 10 minutes, a degree of desorption from the base material was determined.

Figure 3:
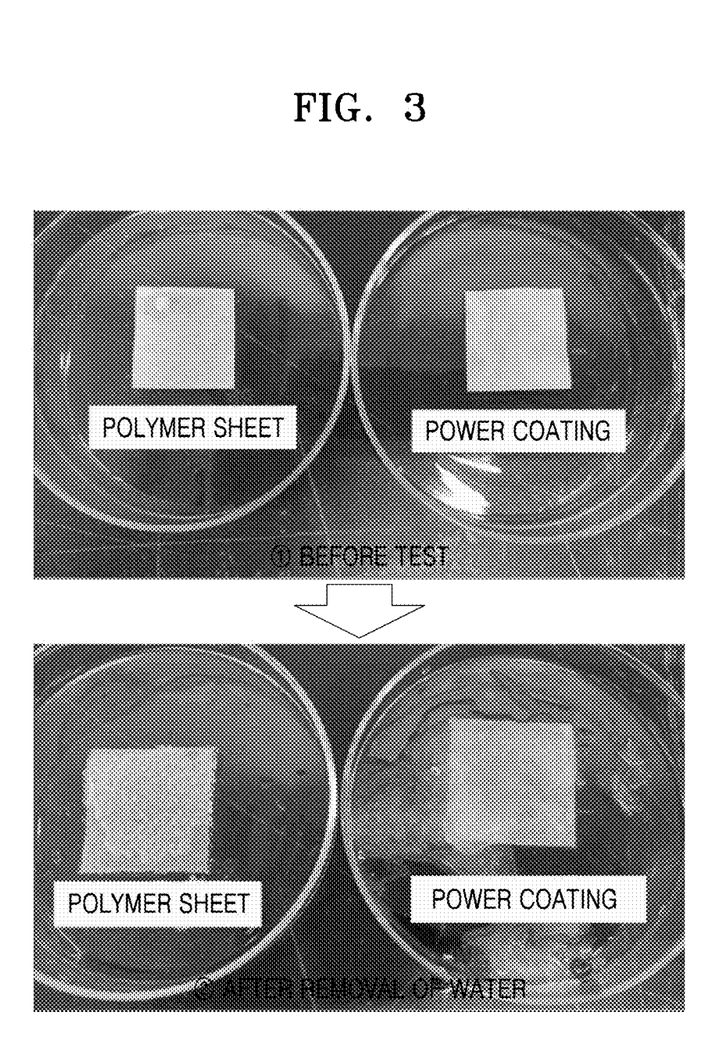
FIG. 3 shows results of a durability test after immersing an absorption-desorption sheet prepared according to Example 1 and a powder-coated sheet prepared according to Comparative Example 1 in water.

FIG. 3 shows the results of a durability test after immersion in water.

Referring to FIG. 3, a petrie dish on the left side included the absorption/desorption sheet of Example 1, and a petrie dish on the right side included the powder-coated sheet of Comparative Example 1. When the immersion in water was performed for 10 minutes, the absorption-desorption sheet increased in volume after the absorption, resulting in irregularities on the surface, but was adhered well to the base material. However, in the powder-coated sheet on the right, the dehumidifying agent was separated and spread out from the base material after the absorption. Since the dehumidifying agent absorbs water and expands a volume thereof, the polymer sheet form capable of maintaining the shape well when immersed in water as compared to the powder particles was found to be advantageous in terms of water resistance or durability.

Evaluation Example 2: Evaluation of Absorption-Desorption Characteristics

Absorption-desorption characteristics of the absorption-desorption sheet of Examples 1 and 2 and the dehumidifying agent of Comparative Examples 1 and 2 were evaluated according to the standard of the humidity response method using an absorption-desorption testing method on building materials (KS F 2611). Each target was cured at relative humidity of 50% for at least 12 hours, and then, a relative humidity was raised to 75% to measure the amount of absorption for 12 hours. The products of Examples 1 and 2 and Comparative Example 1 were prepared to a thickness in a range of about 0.16 mm to about 0.2 mm, which is equivalent to a thickness of a normal wallpaper, whereas the product of Comparative Example 2 used Winia dehumidifying agent without modification.

Figure 4:
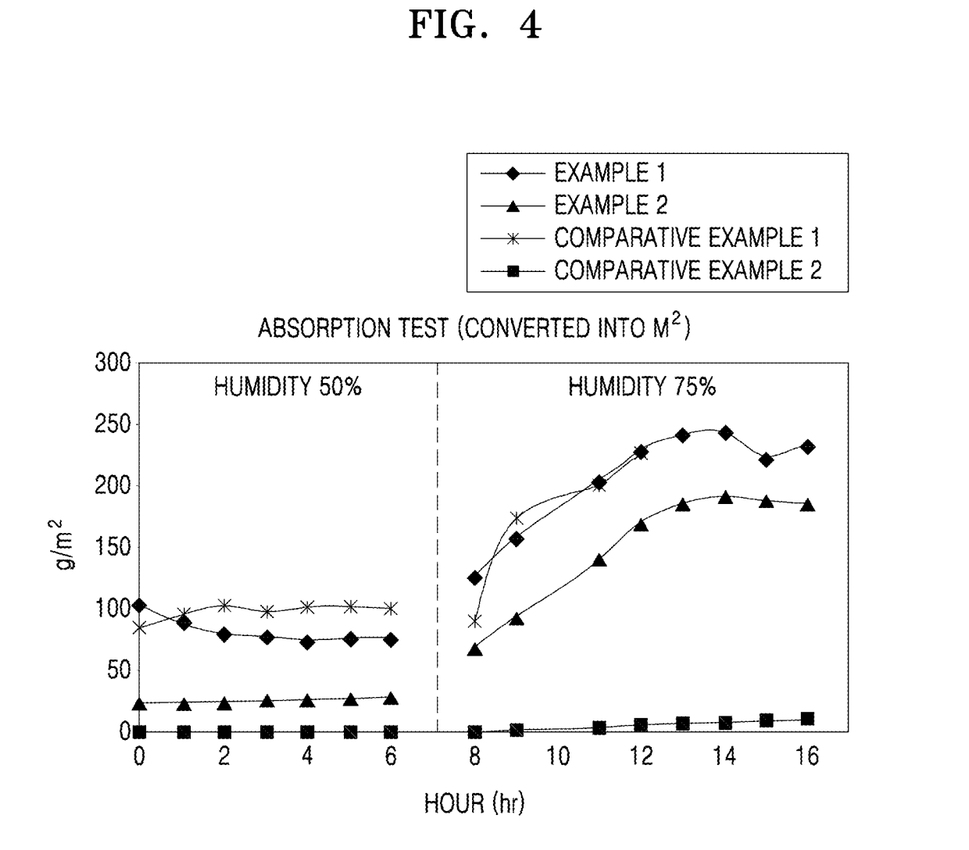
FIG. 4 is a graph showing absorption-desorption cycle characteristics of absorption-desorption sheets prepared according to Examples 1 and 2 and dehumidifying agents prepared according to Comparative Examples 1 and 2.

Then, the results of absorption-desorption cycle characteristics of the absorption-desorption sheets of Examples 1 and 2 and the dehumidifying agents of Comparative Examples 1 and 2 are shown in FIG. 4 and Table 1.

TABLE 1

| Absorption amount per sample | | | | |
|---|---|---|---|---|
| | Example 1 | Example 2 | Comparative Example 1 | Comparative Example 2 |
| Absorption amount (g/m$^2$) (absorption at humidity 75% – absorption at humidity 50%) | 170 | 169 | 141 | 10 |
| Absorption amount (%) (absorption at humidity 75% – absorption at humidity 50%)g/ Dehumidifying agent amount (g) g *100 | 90 | 89 | 57 | 6 |

As shown in FIG. 4 and Table 1, the absorption-desorption sheets of Examples 1 and 2 and Comparative Example 1 had absorption-desorption amounts of 141 g/m$^2$ to 170 g/m$^2$, exceeding the standard of 65 g/m$^2$. However, the dehumidifying agent of Comparative Example 2 had an absorption-desorption amount of 10 g/m$^2$, below the standard. Therefore, it was determined that the absorption-desorption sheets of Examples 1 and 2 and Comparative Example 1 showed significantly better absorption-desorption performance than that of the dehumidifying agent of Comparative Example 2.

The powder-coated sheet of Comparative Example 1 also showed equivalent absorption performance to that of the absorption-desorption sheet of Example 1. However, as shown in Evaluation Example 1, the powder-coated sheet of Comparative Example 1 was vulnerable to water resistance, and thus was not able to be used in an environment in which water may reach.

Evaluation Example 3: Evaluation on Antibacterial/Antifungal/Deodorant Characteristics of Absorption/Desorption Sheet The antibacterial test on the absorption/desorption sheet of Example 1 was performed according to the antibacterial test method using KS K 0693 textile materials. Here, 99.9% antibiosis of 4 test strains was confirmed. The results of the antibacterial test are shown in Table 2 and FIG. 5.

TABLE 2

| Antibacterial test results | | | | |
|---|---|---|---|---|
| Test strain | Initial number of bacteria | Viable cell count after 18 hours | | Test result (bacteria reduction rate (%)) |
| Escherichia coli (E. coli) (ATOC 8739) | 1.0 × 10$^6$ | Control Test | 3.2 × 10$^6$ 7.0 × 10$^2$ | 99.9 |
| Staphylococcus aureus (S. aureus) (ATOC 6538) | 1.0 × 10$^6$ | Control Test | 3.8 × 10$^6$ 9.1 × 10$^2$ | 99.9 |
| Salmonella typhimurium (S. typhimurium) (MCTC 1926) | 1.0 × 10$^6$ | Control Test | 3.3 × 10$^6$ 2.1 × 10$^2$ | 99.9 |
| Pseudomonas aeruginosa (P. aeruginosa) (ATOC 9027) | 1.0 × 10$^6$ | Control Test | 3.5 × 10$^6$ <10 | 99.9 |
| Test method | KS K 0693 (antibacterial test method except for fabric) | | | |
| Sample amount | 0.4 g/glass container | | | |

Figure 5:
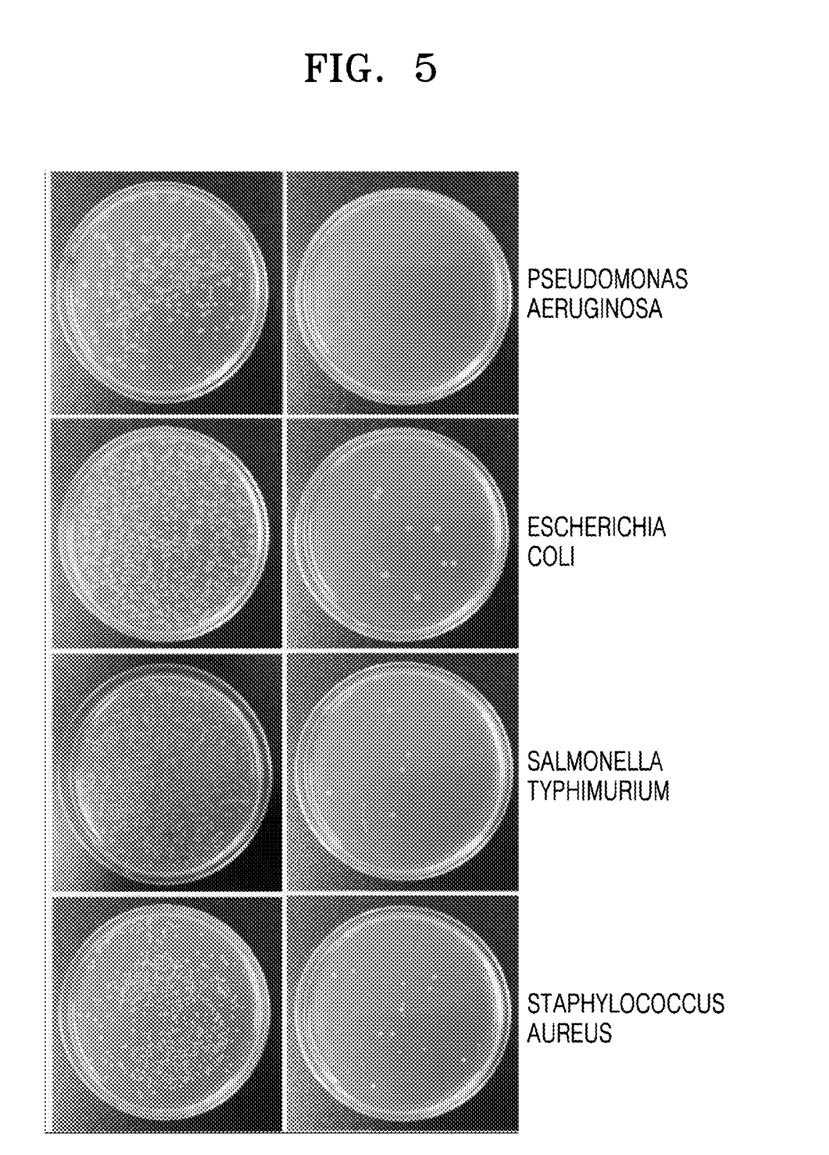
FIG. 5 shows results of an antibacterial test with respect an absorption-desorption sheet prepared according to Example 1.

In FIG. 5, images on the left side represent controls showing normal bacteria growth, and images on the right side represent test groups showing a clean state in which bacterial colonies were not formed.

Figure 6:
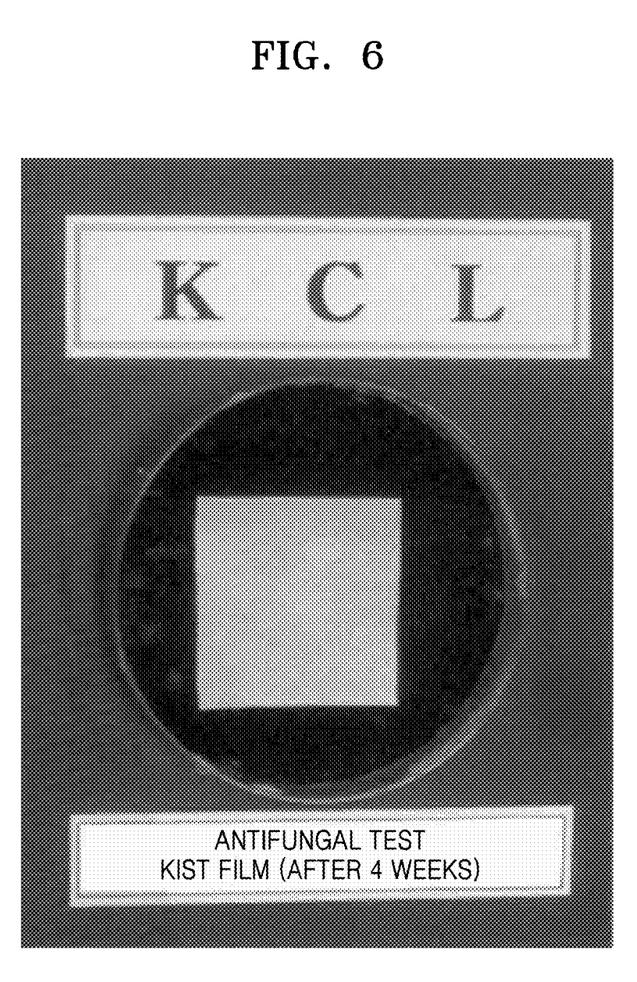
FIG. 6 shows results of antifungal test with respect an absorption-desorption sheet prepared according to Example 1.

In addition, the antifungal test on the absorption/desorption sheet of Example 1 was performed according to the ASTM G 21:2013 test method, and the results thereof are shown in Table 3 and FIG. 6.

TABLE 3

| Antifungal test results | | | | | | |
|---|---|---|---|---|---|---|
| | | Test results Culture period | | | | |
| Test time | Unit | 1 week | 2 weeks | 3 weeks | 4 weeks | Test environment |
| Antifungal test | Level | 0 | 0 | 0 | 0 | (29.0 ± 0.2) ° C. (99.0 ± 1.0) % RH |
| Fungal strain | Aspergillus niger ATCC 9642, Penicillium pinophilum ATCC 11797, Chaetomium globosum ATCC 6205, Gliocladium virens ATCC 9645, Aureobasidium pullulans ATCC 15233 | | | | | |

*Level 0: No mycelial growth was recognized in the inoculated portion of the specimen.

As shown in Table 3 and FIG. 6, based on the antifungal test results on the absorption-desorption sheet of Example 1, it was determined that the absorption-desorption sheet of Example 1 had satisfactory antifungal resistance.

In addition, the deodorant test on the absorption-desorption sheet of Example 1 was performed according to formaldehyde absorption test KS I 3546:2012, and the results thereof are shown in Table 4.

TABLE 4

| Test item | Unit | Result | Absorption test conditions | Load factor | |
|---|---|---|---|---|---|
| Formaldehyde absorption rate (after 7 days) | % | 29.5 | (25 ± 1) °C | 2.0 m²/m³ | Absorption rate(%) = (concentration at inlet − concentration at outlet)/ concentration at inlet × 100 |
| Formaldehyde integral absorption amount (after 7 days) | µg/m³ | 3228.7 | (50 ± 3) % RH | | |

As shown in Tables 2, 3, and 4, it was confirmed that the absorption/desorption sheet according to embodiments exhibited antibacterial, antifungal, and deodorant performance.

Evaluation Example 4: Comparison of Absorption Amount of the Absorption-Desorption Sheet According to Embodiments with that of Commercially Available Wall Paper The performance of a functional wall paper prepared by using the absorption-desorption sheet of Example 1 was compared with that of conventional wall paper available in the market in terms of the absorption amount, and the results thereof are shown in Table 5. As comparative wall papers, 3 types of natural wall paper (2 types of wall paper with porous natural mineral materials applied thereto, and 1 type of wall paper with corn fibers were added thereto), 7 types of PVC wall papers, and 1 type of fiber paper including aqueous acryl were used, and the evaluation was based on the antifungal performance test according to absorption-desorption characteristics of the wallpapers (Moon, Hyun-jun, Kim, Kyeong-min, Yu, Seung-Ho et al., Journal of the Architectural Institute of Korea, published on July, 2013, pages 247-254).

TABLE 5

| | | Relative humidity | | | | | |
|---|---|---|---|---|---|---|---|
| | | 30% | 50% | 70% | 90% | 95% | 70%-50% |
| Commercially available wall papers (by types) | Corn fiber | 0.9% | 2.0% | 3.9% | 9.2% | 11.5% | 1.9% |
| | Porous mineral material1 | 1.9% | 2.8% | 4.3% | 7.9% | 9.2% | 1.5% |
| | Porous mineral material 2 | 1.1% | 1.7% | 2.6% | 4.7% | 5.6% | 0.9% |
| | PVC1 | 1.0% | 1.5% | 2.4% | 3.9% | 4.1% | 0.8% |
| | PVC2 | 1.0% | 1.5% | 2.3% | 4.2% | 4.9% | 0.8% |
| | PVC3 | 1.0% | 1.6% | 2.4% | 4.2% | 4.7% | 0.8% |
| | PVC4 | 1.2% | 1.8% | 2.8% | 4.9% | 5.4% | 1.0% |
| | PVC5 | 0.9% | 1.4% | 2.3% | 4.3% | 4.9% | 0.9% |
| | PVC6 | 0.8% | 1.5% | 2.3% | 4.7% | 5.4% | 0.9% |
| | PVC7 | 1.0% | 1.7% | 2.7% | 5.6% | 6.3% | 1.0% |
| | Aqueous acryl | 0.6% | 0.9% | 1.4% | 2.6% | 3.0% | 0.6% |
| Wall paper invention | Example 1 Absorption/ desorption sheet | 16.2% | 38.1% | 89.2% | 209.2% | 258.8% | 51.1% |

As shown in Table 5, the functional wall paper (KIST SHEET) including the absorption/desorption sheet according to embodiments has significantly high absorption performance in all humidity ranges, as compared with that of other natural wall papers and PVC wall papers.

As described above, a composition for forming an absorption-desorption sheet has excellent absorption/desorption performance and thus an absorption-desorption sheet including the same can be used repeatedly. In addition, the absorption-desorption sheet having antibacterial and deodorant characteristics may inhibit the growth of bacteria and fungi even in a humid environment.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A composition for forming an absorption-desorption sheet, the composition comprising:
    a polymerizable first monomer or oligomer comprising an ionic hydrophilic group;
    a polymerizable second monomer or oligomer comprising a non-ionic hydrophilic group including an oxide-based monomer or oligomer; and
    a deliquescent salt, wherein an amount of the deliquescent salt is in a range of 40 parts to 80 parts by weight based on 100 parts by weight of the total amounts of the first monomer or oligomer and the second monomer or oligomer, and
    wherein an amount of the second monomer or oligomer is in a range of about 30 parts to about 500 parts by weight based on 100 parts by weight of the first monomer or oligomer.

2. The composition of claim 1, wherein the first monomer or oligomer comprises at least one selected from the group consisting of an acrylate-based monomer or oligomer, a vinyl-based monomer or oligomer, and a combination thereof.

3. The composition of claim 2, wherein the acrylate-based monomer or oligomer is in a form in which a metallic salt is bonded to an acrylate.

4. The composition of claim 2, wherein the acrylate-based monomer or oligomer comprises a metallic carbonyl group having at least one selected from a calcium, sodium, lithium, magnesium, potassium, zirconium, and zinc metal.

5. The composition of claim 2, the vinyl-based monomer or oligomer comprises a vinyl group and at least one selected from a sulfonic acid group, a phosphoric acid group, and an ammonium group having a vinyl group.

6. The composition of claim 1, wherein the second monomer further includes an amide-based monomer or oligomer.

7. The composition of claim of claim 6, wherein the amide-based monomer or oligomer comprises at least one selected from the group consisting of acrylamide, methacrylamide, N-methylacrylamide, N-methyl(meth)acrylamide, N-ethylacryl amide, N-ethyl(meth)acrylamide, N-propylacrylamide, and N-propyl(meth)acrylamide.

8. The composition of claim 1, wherein the oxide-based monomer or oligomer comprises at least one selected from the group consisting of ethylene oxide, propylene oxide, isobutylene oxide, 1-butene oxide, 2-butene oxide, trimethylethylene oxide, tetramethylene oxide, tetramethylethyl oxide, butadiene monoxide, octylene oxide, styrene oxide, 1,1-diphenylethylene oxide, starch, and cellulose.

9. The composition of claim 1, wherein the deliquescent salt comprises at least one selected from the group consisting of lithium chloride (LiCl), sodium chloride (NaCl), potassium chloride (KCl), magnesium chloride ($MgCl_2$), calcium chloride ($CaCl_2$), zinc chloride ($ZnCl_2$), sodium hydroxide (NaOH), potassium hydroxide (KOH), potassium carbonate ($K_2CO_3$), potassium phosphate ($KH_2PO_4$), carnallite ($KMgCl_3.6(H_2O)$), and lithium bromide (LiBr).

10. The composition of claim 1, further comprising a solvent.

11. The composition of claim 1, wherein the solvent comprises at least one selected from the group consisting of water, alcohols, benzenes, acetones, esters, aldehydes, and ethers.

12. The composition of claim 1, further comprising at least one selected from the group consisting of an initiator, a cross-linking agent, a catalyst, a viscosity controlling modifier, a dispersant, a filler, an adhesive, and a surfactant.

13. An absorption-desorption sheet comprising the composition of claim 1.

14. A method of preparing an absorption-desorption sheet, the method comprising:
preparing a coating solution comprising the composition of claim 1;
coating a base with the coating solution; and
heating the coated base, thereby polymerizing the coating solution.

15. The method of claim 14, wherein the heating is performed at a temperature in a range of about 30° C. to about 200° C.

16. A composition for forming an absorption-desorption sheet, the composition comprising:
a polymerizable first monomer or oligomer comprising an ionic hydrophilic group;
a polymerizable second monomer or oligomer comprising a non-ionic hydrophilic group that includes an oxide-based monomer or oligomer;
a deliquescent salt; and
a cross-linking agent, wherein the cross-linking agent is N,N'-methylenebisacrylamide, ethylene glycol dimethacrylate, tetra-aryloxy ethane, trimethylolpropane triacrylate, or triarylamine;
wherein
an amount of the second monomer or oligomer is in a range of about 30 parts to about 500 parts by weight based on 100 parts by weight of the first monomer or oligomer, and
an amount of the deliquescent salt is in a range of 40 parts to 80 parts by weight based on 100 parts by weight of the total amounts of the first monomer or oligomer and the second monomer or oligomer.

* * * * *